July 10, 1928.
C. SCHAEFFER
1,677,051
SLEEVE OF THE ENGINE OF THE SLEEVE VALVE TYPE
Filed Feb. 1, 1927     2 Sheets-Sheet 1
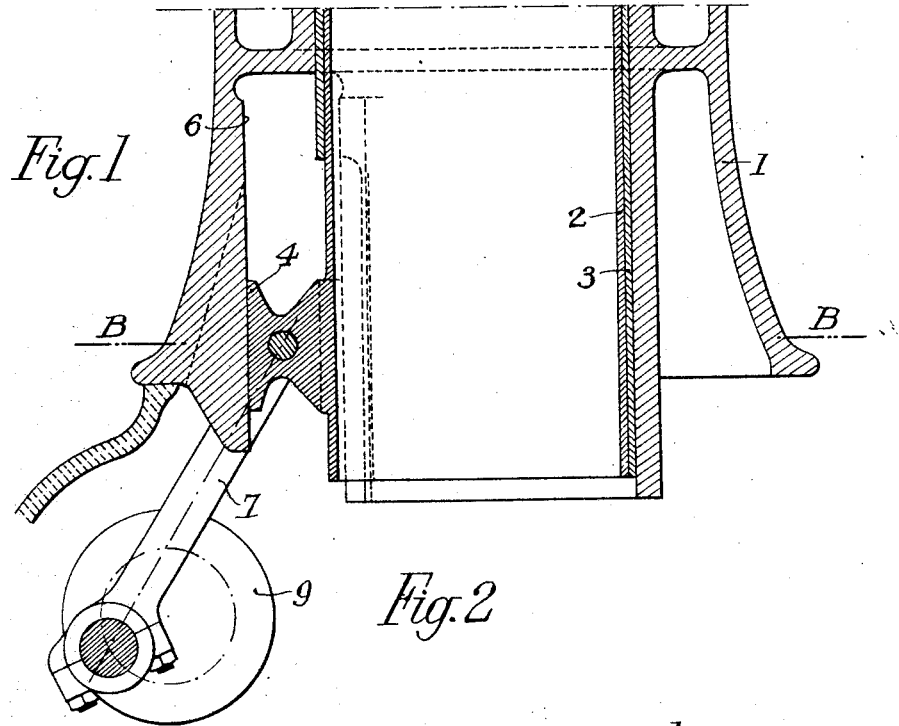
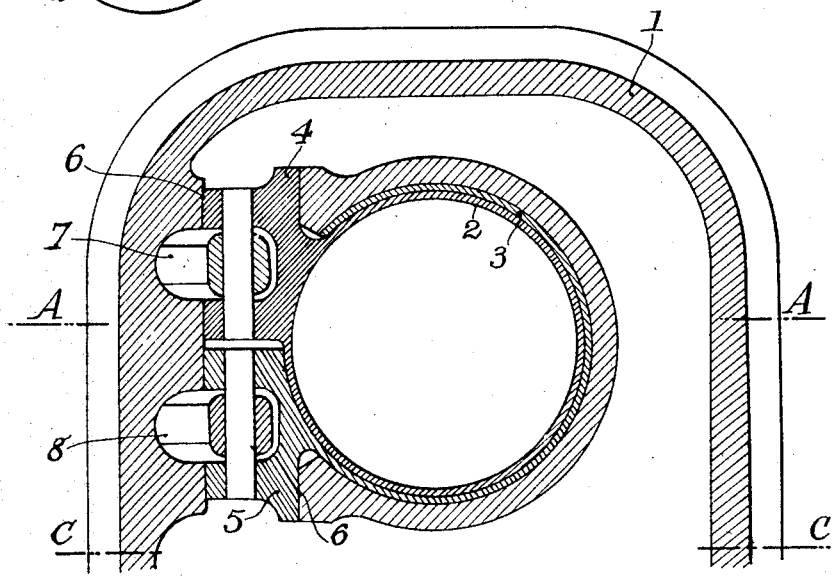
INVENTOR
CHARLES SCHAEFFER
BY
ATTORNEY July 10, 1928.  
C. SCHAEFFER  
1,677,051  
SLEEVE OF THE ENGINE OF THE SLEEVE VALVE TYPE  
Filed Feb. 1, 1927  2 Sheets-Sheet 2

INVENTOR  
CHARLES SCHAEFFER  
BY  
ATTORNEY

Patented July 10, 1928.

1,677,051

UNITED STATES PATENT OFFICE.

CHARLES SCHAEFFER, OF PARIS, FRANCE, ASSIGNOR TO SOCIÉTÉ ANONYME DES ANCIENS ETABLISSEMENTS PANHARD & LEVASSOR, OF PARIS, FRANCE.

SLEEVE OF THE ENGINE OF THE SLEEVE-VALVE TYPE.

Application filed February 1, 1927, Serial No. 165,168, and in France February 8, 1926.

By reason of the disadvantages resulting from the use of cast iron for the sleeves of engines of the sleeve-valve type, which are due to the frequent breakage of the controlling lugs, it has been the custom during the past period to substitute steel sleeves for cast iron sleeves.

In spite of this fact, and even though the lugs are formed in one with the steel sleeves, the said lugs always constitute a weak point, due to the stresses to which they are subjected, and particularly since the current types of high speed engines are so constructed as to diminish the inertia of the moving parts as far as possible by a reduction of the thickness of the sleeve, so that the lugs are often torn off by reason of the alternate bending caused by the driving devices.

The present invention has for its object to obviate all such defects, and it relates to improvements in the sleeves of engines of the sleeve-valve type, whereby the said sleeves will be protected from the alternate flexion and the lateral reactions which are caused by the lateral control of the sleeve.

For this purpose, the lugs of each sleeve are so constructed as to form a slide which is movable in a suitable guide or slot formed in the cylinder, and to which the controlling device is secured.

The appended drawings show by way of example an embodiment of the invention.

Fig. 1 is a partial vertical section of a cylinder comprising two valve sleeves, on the line A—A of Fig. 2.

Fig. 2 is a horizontal section on the line B—B of Fig. 1.

Figure 3:
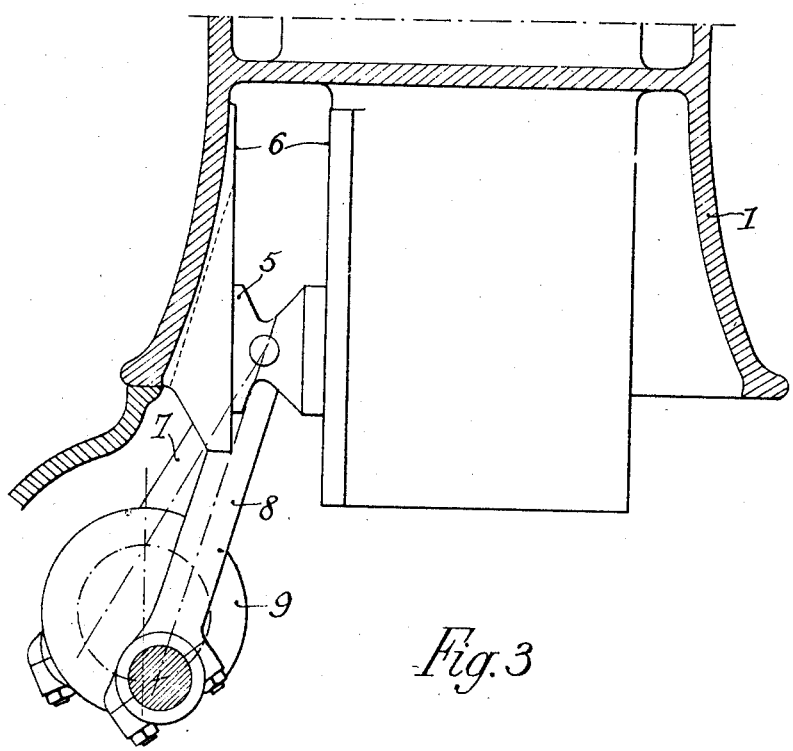
Fig. 3 is an elevational view with parts in section on the line C—C of Fig. 2.

In the cylinder 1 are slidable the two concentric valve sleeves 2 and 3 which are respectively provided with the lugs 4 and 5 movable in a guide 6 integral with the cylinder 1. The said lugs are so constructed as to constitute slides, and the alternate motion of the sleeves is assured in the known manner by means of the links 7 and 8 which are controlled by a shaft 9 provided with eccentrics, said links being mounted upon the slides 4 and 5 as represented. The lugs are thus guided in an approved manner, and they will no longer impart flexion to the valve sleeves, thus obviating all lateral action upon the said sleeves, since the latter are supported entirely by the cylinder itself.

Having thus described by apparatus, what I claim as new therein, and my own invention, is:

1. In an engine of the sleeve-valve type, a sleeve actuated by a crank, and a link pivoted to a lateral lug formed on said sleeve, a stationary guide path adapted to guide the lug of the said sleeve, said guide-path comprising parallel sliding surfaces between which the said lug is guided after the manner of a cross-head, the said sliding surfaces being substantially tangential to the said sleeve.

2. In an engine of the sleeve-valve type, the combination of a cylinder, a sleeve which is slidable therein, a second sleeve which is slidable in the first-mentioned sleeve, a jacket surrounding the said cylinder, the cylinder and the sleeve comprising flat portions which are parallel with one another and are substantially tangent to the cylinder, each sleeve comprising a lug by which it is controlled and which presents trimmed faces to coact with the said flat portions of the cylinder and the jacket.

In testimony whereof I have hereunto affixed my signature.

CHARLES SCHAEFFER.